United States Patent
Montes

[11] Patent Number: 6,023,849
[45] Date of Patent: Feb. 15, 2000

[54] LASER BEAM FOCUS AND ALIGNMENT METHOD

[76] Inventor: David M. Montes, 112 Willow Dr., Lake Mary, Fla. 32746

[21] Appl. No.: 09/384,034

[22] Filed: Aug. 26, 1999

Related U.S. Application Data

[62] Division of application No. 08/828,270, Mar. 21, 1997, Pat. No. 5,950,318.

[51] Int. Cl.[7] ............................................. G01C 15/10
[52] U.S. Cl. .............................. 33/392; 33/756; 33/832
[58] Field of Search .............................. 33/392, 709, 756, 33/832, 833, 836, 813, 814, 818, 830

[56] References Cited

U.S. PATENT DOCUMENTS

| | | |
|---|---|---|
| 1,280,045 | 9/1918 | Kuehn . |
| 1,750,370 | 3/1930 | Straus . |
| 2,705,840 | 4/1955 | Keppler et al. . |
| 3,151,402 | 10/1964 | Gelgessen .................................. 33/392 |
| 4,608,573 | 8/1986 | Paullin . |
| 4,888,881 | 12/1989 | Dudley . |
| 5,113,291 | 5/1992 | Naiki . |
| 5,113,595 | 5/1992 | Emus, Jr. . |
| 5,289,220 | 2/1994 | Fidler et al. . |
| 5,469,633 | 11/1995 | St Peter ....................................... 33/392 |

*Primary Examiner*—Bernard Roskoski
*Attorney, Agent, or Firm*—William M. Hobby, III

[57] ABSTRACT

A laser beam focus and alignment apparatus is provided for a focus engraving laser or the like and has a housing having an attaching portion for removably attaching to a laser apparatus over a laser beam output lens and a linear adjustable portion linearly adjustable relative to the attaching portion. A flexible plumb line has a predetermined length and is attached to the housing linear adjustable portion and has a plumb bob attached to the end thereof with a generally pointed end portion so that a laser beam focus and alignment apparatus can be attached to a laser beam apparatus and linearly adjusted until the plumb bob touches an item being focused upon to determine the focus and alignment of a laser beam. The housing attaching portion and linear adjustable portion can be threaded together so that rotating the linear adjustable portion moves it in a linear fashion to move the flexible bob line and bob. Indicia may be placed on the two parts of the housing for making adjustments and an electrical circuit can have a DC power source connected through an electric lamp into a metal plumb line and plumb bob on one side of the circuit and to ground on the other so that the lamp will be lit upon the point of the plumb bob touching a metal workpiece attached to the laser beam apparatus.

9 Claims, 2 Drawing Sheets

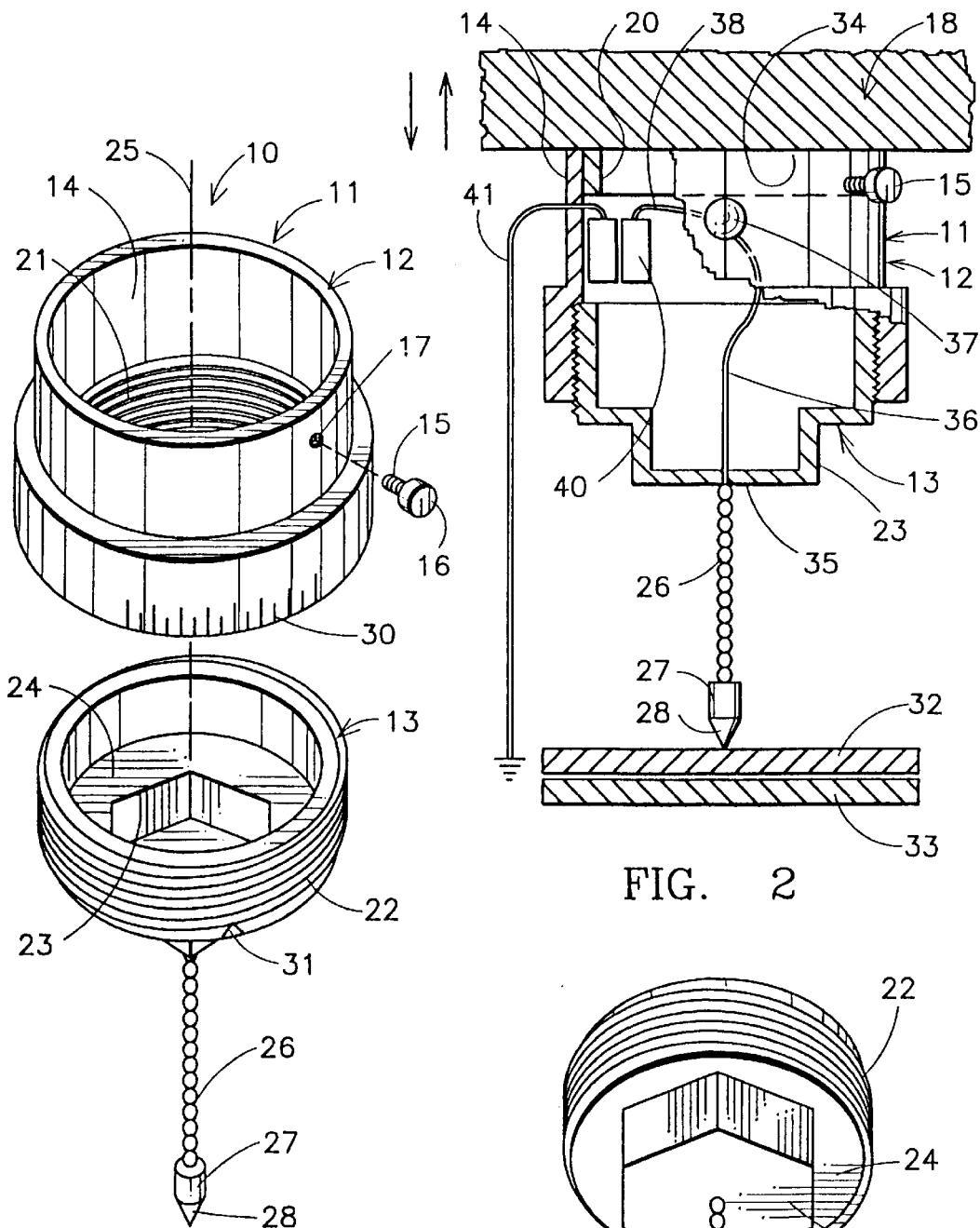

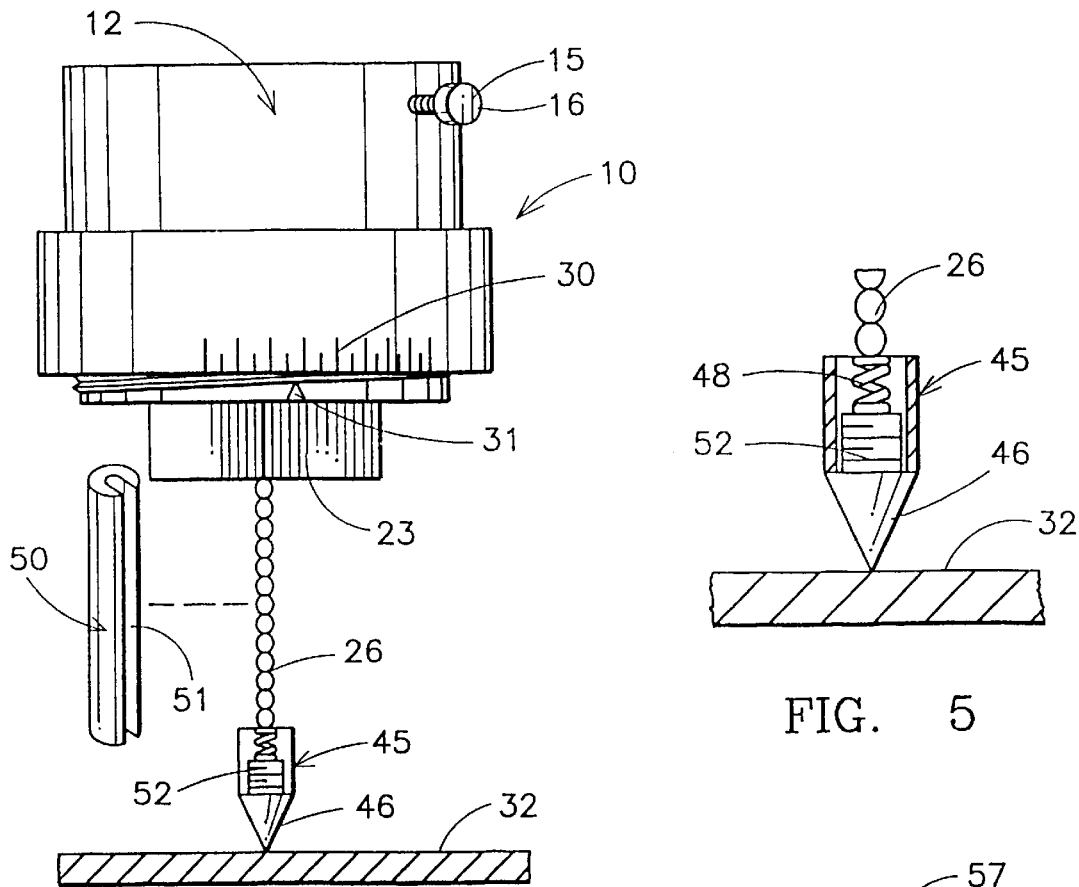
FIG. 4
FIG. 5
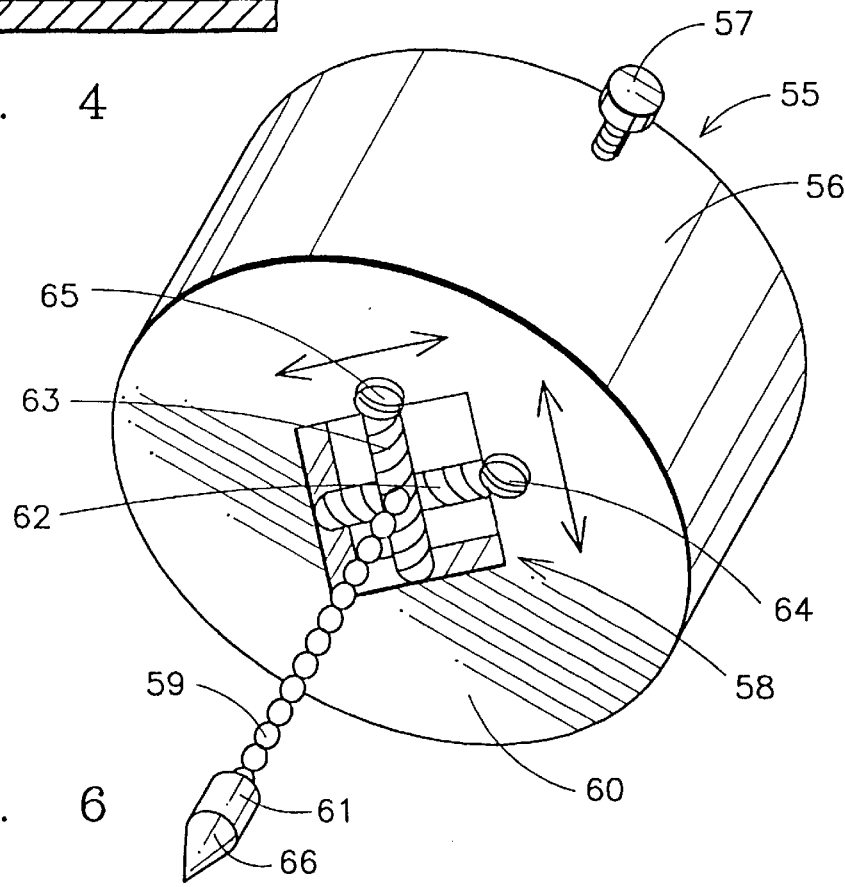
FIG. 6

LASER BEAM FOCUS AND ALIGNMENT METHOD

This is a division of patent application Ser. No. 08/828,270, filed Mar. 21, 1997, now U.S. Pat. No. 5,950,318.

BACKGROUND OF THE INVENTION

The present invention relates to a laser beam focus and alignment method and apparatus and especially to a focus and alignment method for focusing an engraving laser or the like.

In recent years, focus laser beam devices for use in welding, cutting, soldering, scribing, and engraving have come into wide use. These systems employ a laser mounted for control and focusing of the beam onto a workpiece. An optical system is used collimating and focusing the laser beam from an output lens directly onto the workpiece. For best efficiency, these laser systems require that the laser beam be aligned with the product that is to be engraved, welded, cut, soldered, or scribed and focused at a predetermined point. The laser beam can then be directed to engrave indicia, logos, or the like directly onto a workpiece. In a general purpose laser engraving system, the workpieces can be a wide variety of sizes and shapes which can be quickly attached to the apparatus directly in line with the output laser beam. Since the workpieces are of different shapes, it is necessary to align the laser beam for each particular workpiece so that the piece can be properly engraved with the laser beam. The same applies to the focusing of the laser beam used for welding, cutting, soldering, and scribing. Once the laser beam is focused and aligned for a particular workpiece, all of the workpieces of the same configuration can be engraved without readjusting the focus and alignment. However, in focused light engraving, individual units or small numbers of workpieces are engraved for individuals and small companies so that it becomes time consuming to refocus and realign the laser beam for each different workpiece or small number of workpieces.

The present invention is directed towards a laser beam focus and alignment method and apparatus for focusing an engraving laser or the like and can be rapidly attached to a focus engraving laser to quickly determine the focus and alignment for a particular workpiece. The focusing attachment is quickly attached onto the focus laser engraver over the output lens directly in line with the output for the laser where the focus and alignment can be rapidly accomplished and the attachment quickly removed for engraving the workpiece.

In the past, a variety of alignment or focusing systems have been used with laser beam devices. These include using LEDs placed adjacent the output of the laser device to shine one or more LED beams at the point of alignment or at the point of focus, which is moved with the output of the laser beam. Other systems for adjusting focused alignment or distance can be seen in the U.S. patent to Straus, U.S. Pat. No. 1,750,370, for a camera strap for measuring distance from the camera lens, and in the Paullin patent, U.S. Pat. No. 4,608,573, for a focal point positioning tool for measuring the focal point on a conversion reflector. In the U.S. patent to Keppler et al., U.S. Pat. No. 2,705,840, a height measuring device is provided which raises and lowers a head plate until it touches the head of a person. In the Dudley patent, U.S. Pat. No. 4,888,881, a direct height measuring device for surveying instruments above the ground point uses an adaptor positioned in an instrument support on a tripod and a measuring tape is secured to measure the distance to ground. In the Emus, Jr. patent, U.S. Pat. No. 5,113,595, a dart board positioning device uses two measuring lines connected at right angles. The Kuehn patent, U.S. Pat. No. 1,280,045, shows a focal tester for eye lens while the Naiki patent, U.S. Pat. No. 5,113,291, is for an optical axis and focal adjustment mechanism for a semi-conductor laser and collimator lens. The Fidler et al. patent, U.S. Pat. No. 5,289,220, is a detachable close-up lens assembly for an adjustable focus lens camera incorporating a photoranging system and uses a pair of focus ranging light beams for determining focus and distance.

The present invention is directed towards a laser beam focus and alignment method and apparatus for a focused engraving laser or the like which can be rapidly positioned for quickly determining the focus and alignment of a workpiece to be engraved, etched, cut, or the like and in which a focus and alignment attachment can be quickly removed from the output of the focused laser apparatus so that the workpiece can be engraved and which reduces the setup time for a focused engraving laser. The aim of the invention is to be able to rapidly focus and align a focused engraving laser or other focused laser system to reduce the time required for engraving, scribing, welding, cutting, soldering a workpiece.

SUMMARY OF THE INVENTION

A laser beam focus and alignment apparatus is provided for a focus engraving laser or the like and has a housing having an attaching portion for removably attaching to a laser apparatus over a laser beam output lens. A flexible plumb line has a predetermined length and is attached to the housing and has a plumb bob attached to the end thereof with a generally pointed end portion so that a laser beam focus and alignment apparatus can be attached to a laser beam apparatus and moved with the laser output until the plumb bob touches an item being focused upon to determine the focus and alignment of a laser beam. The housing has an attaching portion and linear adjustable portion threaded together so that rotating the linear adjustable portion moves it in a linear fashion to adjust the initial focus length of the flexible bob line and bob. Indicia may be placed on the two parts of the housing for making adjustments. An electrical circuit can have a DC power source connected through an electric lamp and through a metal plumb line and plumb bob on one side of the circuit and to ground on the other so that the lamp will be lit upon the point of the plumb bob touching a metal workpiece attached to the laser beam apparatus. The housing may also have an x-y adjustment mechanism having the plumb line attached thereto for making adjustments in an x-y plane. The method of focusing a laser engraver laser beam includes the steps of selecting the apparatus, then attaching the apparatus to a focus laser engraver and adjusting the laser engraver for the plumb bob to touch a workpiece. The attachment is then removed and the workpiece engraved.

BRIEF DESCRIPTION OF THE DRAWINGS

Other objects, features, and advantages of the present invention will be apparent from the written description and the drawings in which:

FIG. 1 is an exploded perspective view of a laser beam focus and alignment apparatus for an engraving laser or the like;

FIG. 2 is a sectional view of an alternate electromechanical embodiment of a laser beam focus and alignment apparatus;

FIG. 3 is a perspective view of the plumb line and holding portion of the laser beam focus and alignment apparatus of FIG. 1;

FIG. 4 is an exploded perspective of an alternate embodiment of a laser beam focus and alignment apparatus of FIG. 1;

FIG. 5 is a sectional view of the plumb bob portion of the laser beam focus and alignment apparatus of FIG. 4; and FIG. 6 is a perspective view of another embodiment of a laser beam focus and alignment apparatus for a focused engraving laser having an x-y adjustment mechanism for the plumb line and bob.

DESCRIPTION OF THE PREFERRED EMBODIMENT

Referring to the drawings and especially to FIGS. 1 and 3, a laser beam focus and alignment apparatus 10 for a focused engraving laser or the like has a housing 11 having a housing attaching portion 12 and a linear adjustable portion 13. The housing portion 12 has a cylindrical attaching portion 14 having a clamping bolt 15 with a handle 16 thereon which is threaded through a threaded opening 17 so that the cylindrical portion of the housing 14 can be slipped over a focused engraving laser system 18 output cylindrical wall 20, as seen in FIG. 2. The threaded bolt 15 can be threaded in the threaded opening 17 to clamp onto the surface of the laser apparatus output wall 20 to attach the laser beam focus and alignment apparatus 10 thereto. The upper housing 12 has internal threads 21 therein for threading the lower housing 13 external threads 22 thereinto. The lower housing 13 also has a grippable surface 23 extending below the housing below the closed bottom 24. Threading the housing 13 into the housing 12 will cause the housing portion 13 to move linerally along the center axis 25 to move a flexible plumb line 26 linearly up or down upon turning the housing 13 in a clockwise or counterclockwise direction. The plumb line 26 may be a metal chain and may have a metal or electrically conductive bob 27 attached thereto having a generally pointed end 28. The housing 12 can have a series of indicia or adjustment lines 30 thereon while the housing portion 13 might have a pointer or marker line 31 so that rotation of the housing portion 13 in the housing portion 12 can be shown to move in various degrees as the pointer 31 moves relative to the lines 30.

In operation, the laser beam focus and alignment attachment 10 can be rapidly attached to a focused laser engraver 18 or the like, as seen in FIG. 2, by sliding the cylindrical portion 14 over the cylindrical portion 20 of the laser beam engraver 18 and then rotating the clamp screw 15 to attach the focusing attachment thereto. A workpiece 32, which could, for instance be a writing pen to be engraved or could be any gift, jewelry, promotional item, or the like which is to be laser engraved, is attached to a workpiece support 33. The output 34 of the focused laser engraver 18 can then be moved up or down until the bob 27 point 28 exactly touches the top of the workpiece 32 so that the laser beam will then be focused on the point for starting the laser engraving. The housing 13 can be adjusted within the housing 12 to initially set the tip 28 of the plumb bob to the focal point of the laser beam.

In the embodiment of FIG. 2, the plumb line 26 and bob 27 are electrically conductive, such as being made out of a conductive metal. The plumb bob is connected through the base 35 of the extending portion 23 to electrical conductor 36 which is connected to an electric lamp 37. The electric lamp is connected with an electrical conductor 32 to a DC power source, such as a battery 40. The battery is connected through a conductor 41 to ground on the laser engraver frame 33 supporting the workpiece 32. A completed electrical circuit can be formed when the plumb bob 27 touches a workpiece 32 which is conductive to complete a circuit through the lamp 37. Thus, by raising and lowering the engraving laser 18 until the point 28 of the plumb bob 27 touches the workpiece 32 to light the lamp 37 will quickly indicate the focus of the laser beam from the laser engraver 18.

Turning to FIGS. 4 and 5, an alternate embodiment of a laser beam focus and alignment apparatus 10 has the attaching frame portion 12 having the clamping screw 15 with the screw head 16 and the adjustable portion 13 having the plumb line 26 attached to the extending portion 23 in the same manner as illustrated in FIGS. 1 and 3. A new plumb bob 45 has a generally pointed end 46 and has a spring 47 mounted inside a hollow portion 48 thereinside. A rigid spacer member 50 is cut to a predetermined length and has a groove 51 shaped to fit over the plumb line 26 to form a predetermined distance between the housing bottom 23 and the top 52 of the plumb bob 45 to rigidly set the distance therebetween. The rigid space 50 is inserted between the plumb bob and the base of the alignment head. As the plumb bob 45 point 46 pushes against the workpiece 32 surface, point 46 pushes against the plumb bob 45 and against the rigid spacer 50 which is pushed against the spring 48 to change the depth which can be read on a depth gauge 52 on the side of the plumb bob 45. This depth gauge can be used for indicating out-of-focus conditions.

Turning to FIG. 6, another embodiment of a laser beam focus and alignment apparatus 55 has a housing 56 having a clamp screw 57 for clamping to a focused laser apparatus. The housing 56 has an x-y adjustment mechanism 58 mounted on the bottom 60 thereof. The x-y mechanism 58 has the plumb line 60 attached thereto having a plumb bob 61 attached to the end thereof rotating the threaded members 62 and 63. By rotation of the screw heads 64 and 65 allows the x-y adjustment mechanism to move the plumb line 60 in an x-y direction along an x-y coordinate to allow an operator to zero the plumb bob point with a known location of the laser spot for initial set-up of the laser beam focus and alignment apparatus. The point 66 of the laser bob 61 should mark the center of the lens field to compensate for off-center or out-of-tolerance parts in the system.

The method of focusing a laser engraver laser beam or the like includes the step of selecting a laser beam focusing alignment attachment apparatus as heretofore set forth adjusting the plumb line and bob to position the bob point at the focus of the laser beam from the laser beam engraver and attaching the selected laser beam focus and alignment attachment to a laser engraver adjacent the output from the laser engraver. The laser engraver then has the output position adjusted for the plumb bob to touch a workpiece mounted in the focus laser engraver to thereby indicate the focus position for the surface of the workpiece. The attached selected laser beam focus and alignment attachment is then removed from the laser engraver and the workpiece is engraved. The focus of the laser beam focus and alignment attachment can be initially set or adjusted by threadedly adjusting one portion of a housing into a second portion to make fine adjustments to the exact position of the plumb bob point. The method can also include selecting an attachment having an electrical circuit for lighting an electric lamp upon the contact of the plumb bob with the workpiece to indicate the focus position and can make further adjustment with an x-y mechanism having a plumb line attached thereto to adjust for misalignment.

It should be clear at this point that a laser beam focus and alignment method and apparatus for a focused engraving laser has been provided. However, it should also be clear that the same attachment can be utilized with focus laser welders, cutters, and for soldering, scribing, or the like. The attachment can be made of a polymer or any materials desired except that the electrical circuit requires electrically conductive materials. Accordingly, the preset invention is not to be limited to the forms shown which are to be considered illustrative rather than restrictive.

I claim:

1. A method of focusing a laser engraver laser beam comprising the steps of:

selecting a laser beam focus and alignment attachment for focusing engraving laser having a housing having a quick attachment for removably attachment to a laser apparatus over the laser beam output and having a flexible plumb line having a predetermined length attached to said housing and having a plumb bob attached to the end thereof;

adjusting said plumb line and bob to position said bob point at the focus of said laser beam from said laser beam engraver;

attaching said selected laser beam focus and alignment attachment to a laser engraver adjacent the output therefrom to have said plumb bob point at the focus point of said laser engraver output laser beam;

adjusting said laser engraver output for said plumb bob to touch a work piece mounted in said focused laser engraver;

removing said attached selected laser beam focus and alignment attachment; and engraving a workpiece.

2. A method of focusing a laser engraver laser beam in accordance with claim 1 in which the step of selecting a laser beam focus and alignment attachment includes:

selecting a attachment having a housing having an attaching portion for removably attaching to a laser apparatus over a laser beam output and a linear adjustable portion linearly adjustable relative to said attaching portion; and adjusting said linear adjusting portion to set the plumb bob to the laser beam focus point.

3. A method of focusing a laser engraver laser beam in accordance with claim 2 in which the step of selecting a flexible plumb line having a bob attached thereto includes selecting a flexible electrically conductive plumb line and plumb bob.

4. A method of focusing a laser engraver laser beam in accordance with claim 3 in which the step of selecting a laser beam focus and alignment attachment includes selecting an attachment having an electrical circuit having a DC power source connected through an electric lamp and to said electrically conductive plumb line and bob and said DC power source being grounded to said laser engraver and through a workpiece attached to said laser engraver; and adjusting said laser engraver attachment until said plumb bob touches said workpiece and lights the lamp.

5. A method of focusing a laser engraver laser beam in accordance with claim 4 including the step of removably clamping said housing to a laser engraver over the laser beam output therefrom.

6. A method of focusing a laser engraver laser beam in accordance with claim 5 in which the step of selecting a housing includes selecting a housing having a linear adjustable portion having external threads thereon threadably engaging internal threads on said housing attaching portion whereby rotating said linear attaching portion threads said linear attaching portion linearly to initially set the focus of said laser focus attachment.

7. A method of focusing a laser engraver laser beam in accordance with claim 6 including the steps of selecting a rigid plumb line spacer; and removably attaching said selected rigid plumb line spacer to said flexible plumb line.

8. A method of focusing a laser engraver laser beam in accordance with claim 7 including the step of selecting a plumb bob having a hollow housing having a spring mounted therein and attached to said plumb line.

9. A method of focusing a laser engraver laser beam in accordance with claim 1 including the step of selecting a housing having a plumb line attaching x-y mechanism; and adjusting the position of said plumb line in an x-y plane.

* * * * *